United States Patent [19]
Imamura et al.

[11] 3,913,652
[45] Oct. 21, 1975

[54] RUBBER ARTICLES REINFORCED WITH HIGH MODULUS FIBER CORDS AND PNEUMATIC TIRES REINFORCED WITH SUCH FIBER CORDS

[75] Inventors: Takaaki Imamura, Akigawa; Masayuki Matsui, Kodaira; Seisuke Tomita, Higashi-Murayama; Masahiro Makita, Kodaira; Tsunemasa Nakajima, Higashi-Murayama; Koji Chiba, Higashi-Yamato; Nobuyoshi Shimazaki, Kodaira, all of Japan

[73] Assignee: Bridgestone Tire Co., Ltd., Tokyo, Japan

[22] Filed: May 31, 1973

[21] Appl. No.: 365,680

[30] Foreign Application Priority Data
June 1, 1972   Japan.............................. 47-53840

[52] U.S. Cl.......... 152/361 R; 152/353 R; 152/354; 152/357 R; 152/361 FP; 152/362
[51] Int. Cl.²... B60C 9/18; B60C 9/02; B60C 13/00
[58] Field of Search............ 152/361 R, 352, 353 R, 152/354, 357 R, 362 R, 362 CS, 374

[56] References Cited
UNITED STATES PATENTS

| | | | |
|---|---|---|---|
| 3,083,749 | 4/1963 | Destinay et al. | 152/361 R |
| 3,253,636 | 5/1966 | Travers | 152/362 R |
| 3,392,773 | 7/1968 | Warren et al. | 152/362 R |
| 3,500,890 | 3/1970 | Boileau | 152/361 FP |
| 3,512,568 | 5/1970 | Delobelle | 152/361 R |
| 3,598,165 | 8/1971 | Hanus | 152/361 R |
| 3,613,763 | 10/1971 | Fletcher | 152/361 FP |
| 3,853,163 | 12/1974 | Mezzanotte | 152/353 R |

*Primary Examiner*—Drayton E. Hoffman
*Attorney, Agent, or Firm*—Sughrue, Rothwell, Mion, Zinn & Macpeak

[57] ABSTRACT

Rubber articles reinforced with high modulus fiber cords are produced by covering the vicinity of the cord end with a rubber containing synthetic polyisoprene having not less than 90 percent by weight of cis-1,4-isoprene unit, the amount of said synthetic polyisoprene being not less than 20 percent by weight of the total rubber hydrocarbon. By such means, a highly reinforced pneumatic tire can be manufactured.

5 Claims, 9 Drawing Figures

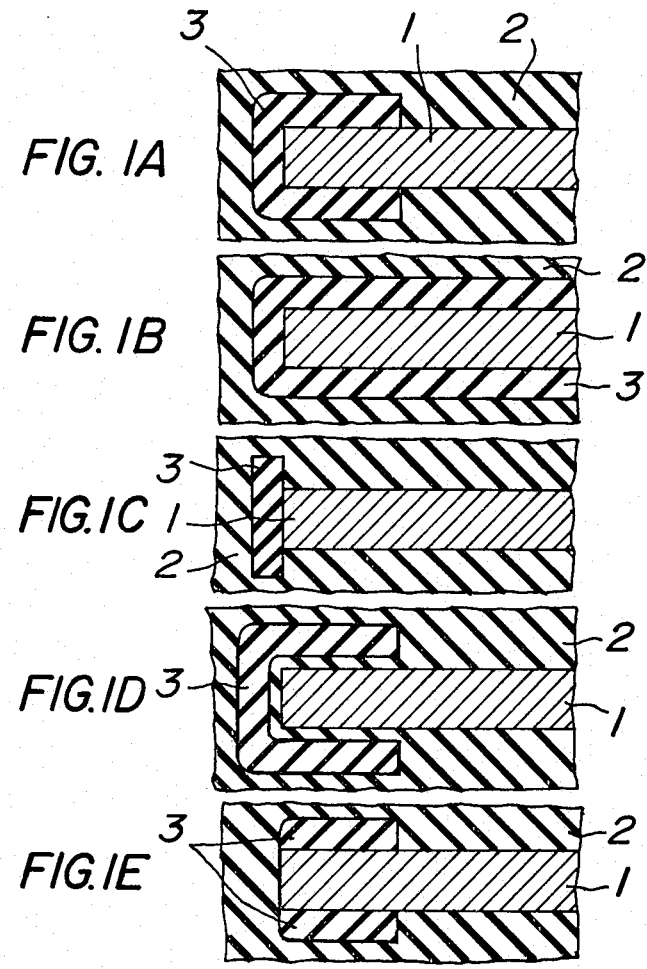

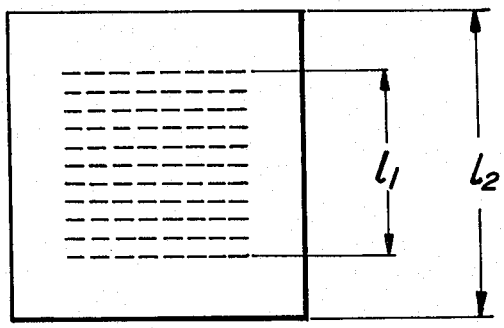
FIG.2A
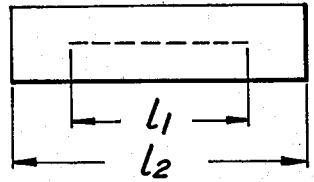
FIG.2B
FIG. 3
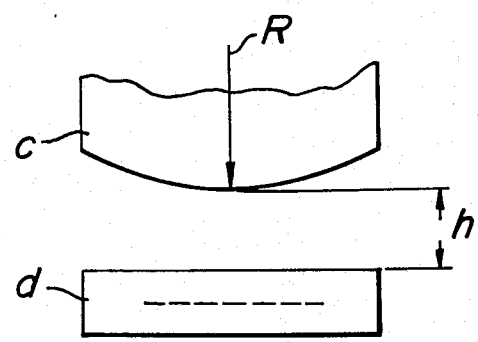

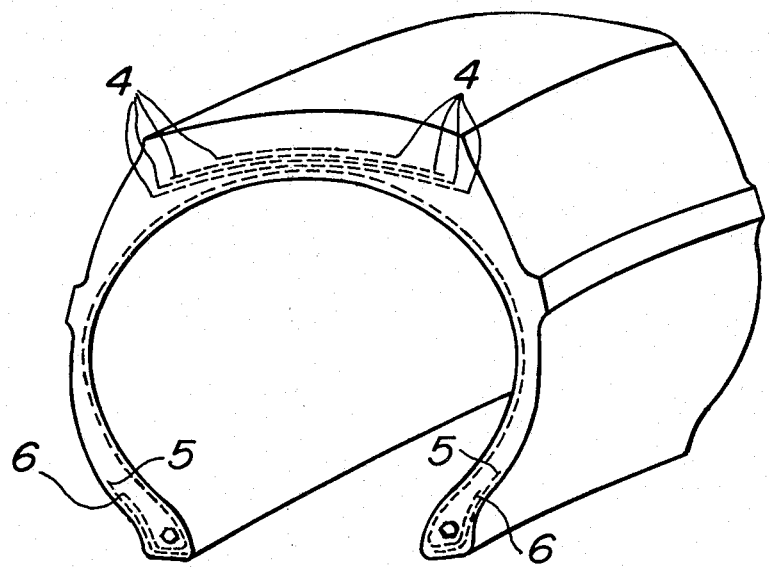
FIG_4

RUBBER ARTICLES REINFORCED WITH HIGH MODULUS FIBER CORDS AND PNEUMATIC TIRES REINFORCED WITH SUCH FIBER CORDS

BACKGROUND OF THE INVENTION

1. Field of the Invention

The present invention relates to rubber articles reinforced with high modulus fiber cords in which a breakdown caused from the ends of the high modulus fiber cord is remarkably reduced, and to a method for producing said rubber articles, and particularly to a method for reinforcing the ends of high modulus fiber cords incorporated in a tire. The term "end of high modulus fiber cord" used herein means the cut end formed when the high modulus fiber cords coated with rubber are cut in a desired length in the production of tires.

2. Description of the Prior Art

Owing to the continuing requirements for stability and safety at high speed, improved tires are required and consequently tires having specific structures, such as radial tires, belted bias tires and the like have been rapdily developed. High modulus fiber cords are usually used at, at least, some portions in these tires. For example, in the breaker, it is necessary to define a hoop which constricts the tire strongly, and high modulus fiber cords having a high Young's modulus, such as steel, glass fiber and the like are used. In the radial tire, the movement of the bead section is apt to become large, and therefore high modulus fiber cords, such as steel are used for the chaffer in order to prevent such a movement. Furthermore, the radial ply cords of a large type tire used in trucks and buses, and off-the-road vehicles in which the heat generated during high speed running is a great cause of breakdown, use high modulus fiber cords composed of steel having a high heat resistance. When these high modulus fiber cords are used for the breaker, chaffer and ply, it is likely that a very large stress concentration occurs at the rubber portion which contacts with the cut ends of the high modulus fiber cords, because the cords are stiff. Cracks are usually formed in the rubber portion and the cracks grow gradually, resulting in a breakdown of the tire (referred to as "end separation" hereinafter). The radial tire has this inherent drawback which has substantially not been observed in the usual tires. In order to prevent such drawback, various studies for reducing the stress concentration in such a portion have been made. For example, the uses of soft rubber or hard rubber have been proposed in Japanese Pat. No. 238,506, British Pat. No. 753,963, U.S. Pat. No. 3,111,976 and the like. However, the above described drawback has not been obviated satisfactorily by these proposals, because substantially all breakdowns in the tires using the high modulus fiber cords result from the end separation caused from the ends of the high modulus fiber cords.

SUMMARY OF THE INVENTION

An object of the present invention is to provide reinforced rubber articles in which the ends of the high modulus fiber cords in the rubber articles do not substantially cause end separation.

Another object of the present invention is to provide a method for producing pneumatic tires in which the end separation is prevented by reinforcing the ends of the high modulus fiber cords.

The inventors have studied various ways for accomplishing the above described objects and found that the objects can be accomplished by arranging a rubber compound consisting mainly of a synthetic polyisoprene at the cut ends of the high modulus fiber cords.

Namely, the present invention has been made based on the above described discovery and is characterized in that a rubber compound containing not less than 20 parts by weight of the total rubber hydrocarbon, of a synthetic polyisoprene rubber is arranged in the vicinity of the ends of the high modulus fiber cords. The term "high modulus fibers" used in the present invention means stiff fibers consisting of metals and glass having a Young's modulus of not less than $4.0 \times 10^5$ $Kg/cm^2$ and steel cords are particularly preferable.

The synthetic polyisoprene rubber to be used in the present invention comprises stero-specific polymers obtained from isoprene monomers by using Ziegler-Natta catalyst or alkyllithium catalyst, which have not less than 90% of cis-1,4-isoprene unit when determined by infrared spectro-photometer.

The particularly preferred polyisoprene for the object of the present invention is a synthetic isoprene rubber having not less than 95% of cis-1,4-isoprene unit and a Mooney viscosity of not less than 40.

Unless the amount of the synthetic polyisoprene rubber is not less than 20 parts by weight of the total rubber hydrocarbon, the activity is poor, and the preferred amount is not less than 50 parts by weight of the total rubber hydrocarbon. Rubbers used together with synthetic polyisoprene rubber may be usual rubbers but natural rubber and diene series rubbers, such as styrene-butadiene copolymeric rubber and cis-polybutadiene rubber or the blends of these rubbers aree preferable because of their high compatibility with the synthetic polyisoprene rubber. Among them, natural rubber is the most preferable in view of the adhesion to the high modulus fibers and its good processability. When the total amount of the synthetic polyisoprene rubber and natural rubber is not less than three-fourths of the total rubber hydrocarbon, the best results can be obtained.

The rubber to be used in the present invention is characterized in that the synthetic polyisoprene rubber is not less than 20 parts by weight of the total rubber hydrocarbon and the other compounding agents are not particularly limited but the unique property of the synthetic polyisoprene lies in development of a very high fatique resistance and therefore it is not desirable to compound substances which deteriorate the fatique resistance. That is, plastics which cause a heterogeneous dispersion and fillers having no reinforcement should not be compounded. As carbon blacks, lower carbons, such as FT, GPF and the like to higher carbons, such as FEF, HAF and the like are preferably used. An adhesive compounding which is usually used for the high modulus fibers, is preferable and it is preferred that the amount of a softenner is small.

The high modulus fibers to be used in the present invention are fibers having a very low elongation, such as metal, glass and the like. Among them, the most preferable fibers are fibers having a diameter of about 0.1–0.5 mm obtained by cold drawing carbon steel. These fibers are twisted to form a cord. The above described carbon steel fibers are applied with brass plating of 1–10 g/l Kg and the preferable composition of the brass is 80–50 percent by weight of copper and 20–50 percent by weight of zinc.

The position where the synthetic polyisoprene rubber is arranged, is very important. According to the usual technique in the production of tires, the high modulus fiber cords are coated with a rubber by a calender and then cut into a desired length. The cut rubber coated cords are molded together with a tread rubber, a side rubber, bead wires and the other necessary elements by a molding machine and the assembly is integrated by vulcanization into a tire.

In the present invention, the synthetic polyisoprene rubber covers the end portion of the high modulus fiber cord in the following manner. That is, the rubber covers an area within 1 mm forward of the end surface of the fiber cord and/or an area of at least 10 mm along the cord axis from the end of the cord and within 1 mm from the peripheral surface of the cord as shown in FIGS. 1A to 1E.

Even if the synthetic polyisoprene rubber is used beyond the above described area, the effect of the present invention can not be improved. Even if the synthetic polyisoprene rubber is arranged on only a part of the above described area, the effect of the present invention noticeably appears and therefore in many cases the commercially satisfactory result can be obtained only by such a treatment. Furthermore, it is not always necessary to use the synthetic polyisoprene rubber in contact with the steel cord. These arranging manners are shown in FIG. 1A to 1E. Namely, the reinforcing layer 3 composed of the synthetic polyisoprene rubber is arranged as in the embodiments of FIG. 1A to 1E. A matrix rubber 2 surrounding the cord is not particularly limited. In this drawing, only the cut ends of cord 1, the cut face of which is perpendicular to the axial direction of the cord, are shown but the end may be cut in an inclined direction or the twisted fibers at the end of the cord may be untwisted. Moreover, when the input is considerably biased against the center axis of the cord, it is effective that only one side of the cord is reinforced. In the above five embodiments, the effectiveness of the reinforcement decreases in the descending order of illustration, that is FIG. 1A>FIG. 1B>FIG. 1C>FIG. 1D>FIG. 1E.

The reinforcing process of the present invention can be applied to tires wherein high modulus fiber cords are used. Such tires are radial tires and belted bias tires and the reinforcing process can be applied to the cut ends of the breaker, ply and chaffer where the high modulus fibers are used. These examples are the steel breaker end, glass breaker end, steel ply end, steel chaffer end, of a radial tire; and the steel belt end and glass belt end of a belted bias tire. The question of which cut end of the breaker, chaffer and ply should be reinforced depends upon use and size of the tire and the portion applied to the highest load is reinforced. In some uses, it is necessary to reinforce all the cut ends.

The effect of the present invention will be explained in detail in the following Examples but the life of the tire according to the present invention in terms of end separation is about 3 times longer than that of the rubber compound composed of only natural rubber which has been heretofore used at the ends of the high modulus fiber cords. Only an improvement of about ten percent is attained by natural rubber compound. Namely, the effect of the present invention is based on the unique property of the synthetic polyisoprene rubber and it is considered that the effect of the present invention is obtained by arranging the specific rubber at a proper position.

BRIEF DESCRIPTION OF THE DRAWINGS

FIGS. 1A to 1E show cross-sectional views of various arrangements of the reinforced layers according to the present invention;

FIGS. 2A and 2B show a plan view and an elevational view, respectively, of a test piece having embedded therein reinforcing high modulus fiber cords;

FIG. 3 is an elevational view showing a correlation between a sample piece (d) and the striking face of a hammer (c); and FIG. 4 is a cross-sectional view showing the arrangement of the breaker ends, chaffer ends and ply ends.

DETAILED DESCRIPTION OF PREFERRED EMBODIMENTS

The following examples are given for the purpose of illustration of this invention and are not intended as limitations thereof.

EXAMPLE 1

This example shows the effect of a rubber containing synthetic polyisoprene rubber against the end of the high modulus fiber cords in a relation to the amount of the synthetic polyisoprene rubber.

The following rubber compounds were prepared in a usual manner.

| Compound recipe No. | 1 | 2 | 3 | 4 | 5 | 6 |
| --- | --- | --- | --- | --- | --- | --- |
| Natural rubber RSS No. 1 | 100 | 75 | 50 | 25 | 0 | 0 |
| Synthetic polyisoprene rubber Natsyn No. 2200* | 0 | 25 | 50 | 75 | 100 | 0 |
| Synthetic polyisoprene rubber Cariflex No. 305** | — | — | — | — | — | 100 |
| Carbon black HAF | 50 | 50 | 50 | 50 | 50 | 50 |
| Zinc oxide | 7 | 7 | 7 | 7 | 7 | 7 |
| Sulfur | 3 | 3 | 3 | 3 | 3 | 3 |
| N-cyclohexylbenzothiazole sulfenamide | 0.5 | 0.5 | 0.5 | 0.5 | 0.5 | 0.5 |
| Phenyl-β-naphthylamine | 1 | 1 | 1 | 1 | 1 | 1 |
| Alkylphenol resin | 5 | 5 | 5 | 5 | 5 | 5 |
| Cobalt naphthenate | 3 | 3 | 3 | 3 | 3 | 3 |

*Natsyn No. 2200 (Trade Name) use of Ziegler-Natta catalyst, content of cis-1,4-isoprene unit: 97%, Mooney viscosity: 82

**Cariflex No. 305 (Trade Name) use of alkyllithium catalyst, content of cis-1,4-isoprene unit: 94%, Mooney viscosity: 78

The steel cords (structure: 1×3×0.20+6×0.38, copper/zinc: 7/3 brass plating, amount of the plating: 5.5 g/l Kg cords) were used as the high modulus fibers and embedded in the sheet of the above rubber compounds at a count of 17 cords/5 cm by means of a wrapping machine. The thus obtained coated cords were cut in a direction perpendicular to the cord direction and the resulting cut ends were used as a sample end. The cut coated cords were further coated with the same rubber compounds to prepare specimens or test pieces as shown in FIGS. 2A and 2B. A stimulation was applied on the cut end of steel cords in such a manner that a hammer as shown in FIG. 3 (weight: 32.4 Kg, radius of curvature of striking surface (R):55 cm) was dropped from a height of 120 mm at a rate of 60 times per minute so as to apply a constant energy to the specimen. In FIGS. 2A and 2B, $l_1$ was 30 mm and $l_2$ was 50 mm. The striking times were divided into 7 optional classes and after the completion of the test, the rubber was cut along the cord and the size of the crack was measured. This crack was very similar to the state of end separation caused in the practically run tire. The relationship of the striking times to the size of the crack which grows along the cord axis from the end of the fiber cords was plotted and the striking times until the size of crack becomes 2 mm was defined as an end separation life in the cut end of cords. The results are shown as follows:

| Rubber Compound No. | (1) | (2) | (3) | (4) | (5) | (6) |
| --- | --- | --- | --- | --- | --- | --- |
| End separation life (time) | 900 | 1,100 | 1,500 | 2,100 | 2,800 | 1,600 |

These results show that the synthetic polyisoprene rubber has a remarkable effect for reinforcement of the end of steel cords as compared with the natural rubber. Furthermore, such an effect appears sufficiently at the amount of the synthetic polyisoprene rubber of 25 PHR, and the amount of more than 50 PHR is preferable in order to develop the remarkable effect.

The above results also show that the larger the content of cis-1,4-isoprene unit in the synthetic polyisoprene rubber, the higher the effect.

EXAMPLE 2

This example shows the effect depending upon the kind of polymers to be used together with the synthetic polyisoprene rubber.

The following rubber compounds were prepared in the usual manner.

| Compounding recipe No. | 1 | 2 | 3 | 4 | 5 | 6 | 7 | 8 |
| --- | --- | --- | --- | --- | --- | --- | --- | --- |
| Synthetic[1] polyisoprene rubber | 25 | 25 | 50 | 50 | 75 | 75 | 50 | 50 |
| Natural rubber[2] | — | — | — | — | — | — | 25 | 25 |
| Styrene-butadiene[3] copolymer rubber | 75 | — | 50 | — | 25 | — | 25 | — |
| Cis-polybutadiene[4] rubber | — | 75 | — | 50 | — | 25 | — | 25 |
| Carbon black HAF | 50 | 50 | 50 | 50 | 50 | 50 | 50 | 50 |
| Zinc oxide | 7 | 7 | 7 | 7 | 7 | 7 | 7 | 7 |
| Sulfur | 3 | 3 | 3 | 3 | 3 | 3 | 3 | 3 |
| N-cyclohexyl-benzothiazole sulfenamide | 0.5 | 0.5 | 0.5 | 0.5 | 0.5 | 0.5 | 0.5 | 0.5 |
| Phenyl-β-naphthylamine | 1 | 1 | 1 | 1 | 1 | 1 | 1 | 1 |
| Alkylphenol resin | 5 | 5 | 5 | 5 | 5 | 5 | 5 | 5 |
| Cobalt naphthenate | 3 | 3 | 3 | 3 | 3 | 3 | 3 | 3 |

[1]Natsyn No. 2200,
[2]RSS No. 1
[3]SBR No. 1500,
[4]JSR-BROI (Trade Mark)

The end separation life was measured according to the method described in Example 1 to obtain the following results.

| Rubber compounds No. | 1 | 2 | 3 | 4 | 5 | 6 | 7 | 8 |
| --- | --- | --- | --- | --- | --- | --- | --- | --- |
| End separation life (time) | 1,150 | 1,050 | 1,300 | 1,150 | 1,900 | 1,750 | 1,500 | 1,450 |

From these results it can be seen that any diene rubbers used together with the synthetic polyisoprene rubber show the excellent effect. Considering these results together with the results in Example 1, it can be seen that when the amount of the synthetic polyisoprene rubber is not less than one-half of the total rubber hydrocarbon and the amount of the synthetic polyisoprene rubber and natural rubber is not less than three-fourths of the total rubber hydrocarbon, the effect of the present invention particularly noticeably appears.

EXAMPLE 3

This example illustrates the results obtained with different kinds of high modulus fibers.

As a surface modified steel cord of the steel cord used in Example 1 (structure 1×3×0.20+6×0.38. 7/3 brass plating, amount of plating: 5.5 g/1 Kg cords), use was made of a steel cord in which said brass plated steel cord was further applied to tin plating (amount of tin plating: 0.19 g/1 Kg cords). Furthermore the twisting structure of the cord was changed. That is, the twisting structure was 1×3+5×7×0.15+1. By using such steel cords, the end separation life was determined by using the rubber compound of Example 1, No. 5 to obtain the following result.

|  | Tin plated steel cords | Cord of 1×3+5×7×0.15+1 |
| --- | --- | --- |
| End separation life (time) | 2,900 | 2,850 |

The above data show that the effect of the present invention does not depend upon the kind of high modulus fibers and that in any of these steel cords, the unique property of the synthetic polyisoprene rubber can be developed.

EXAMPLE 4

This example will explain with respect to the location of the synthetic polyisoprene rubber to be disposed.

The embodiments as shown in FIGS. 1A to 1E were examined in accordance with the test method described in Example 1. In FIGS. 1A to 1E, 1 represents steel cords of 1×3×0.20+6×0.28, each diameter of which was 1.16 mm. A matrix rubber 2 was the rubber compound of Example 1, compound No. (1) and a reinforcing layer 3 was the rubber compound of Example 1, compound No. (5) and a gauge of reinforcing layer was about 1 mm. The obtained results are shown as follows together with the results of Example 1 wherein the matrix rubber and the reinforcing rubber were the same to each other.

The above described results show that it is important that the cord end portion is covered with the reinforcing layer of the synthetic polyisoprene rubber at an area within at least 1 mm forwards the end of the cord or at an area within 1 mm from the cord surface over a distance of 10 mm from the end of cords along the cord axis. Furthermore, when the whole of these areas is covered with the reinforcing layer, the effect of the present invention becomes very noticeable. Also, if the above described areas are covered completely, the rubber to cover the other area may be any rubber, that is the above described embodiment of FIG. 1D *1 can attain the object of the present invention.

EXAMPLE 5

This example will explain with respect to embodiments of applying the method of reinforcing the cut ends of high modulus fiber cords according to the present invention to end of folded steel cord ply and end of steel cord chaffer in steel radial tires for trucks and busses.

The size of the tire was 10.00 – 20. The end 5 of chaffer and the end 6 of ply as shown in FIG. 4 were covered with the reinforcing layers of the type shown in FIG. 1A, having a thickness of 1 mm, respectively. The ply cords and the chaffer cords used steel cords having a twisting structure of 1×3+5×7×0.15+1 and the rubber compound of Example 1, compound No. (5) was used. Except for the above conditions, the tires were manufactured in the conventional manner and were installed on the rear wheels of a dump truck. A particularly high load was applied so as to apply a high load to the bead section. The radial tires reinforced by the method of the reinforcement of steel cord ends according to the present invention were run until the tread rubber was worn out (70,000 Km) but there was no trouble in the bead section. On the other hand, the conventional tires having applied thereto no reinforcement of the present invention experienced end separation from the chaffer ends at an initial running period (26,000 Km) and the running was impossible. When the tires were examined by cutting said tires, the chaffer ends and the ply ends of the tires provided with the reinforcing layer according to the present invention were still normal, while the chaffer ends of the tires without the reinforcement of the present invention were completely destroyed and cracks were caused in the ply ends, the length of which reached to about 10 mm at most. Further, a large amount of abraided powder caused by the friction of rubbers themselves was formed at the end of the cords, which represents an impending occurrence of end separation.

The above result shows that the present invention is very practical and is effective to both ends of the ply

|  | Fig. 1, (1) | Fig. 1, (2) | Fig. 1, (3) | Fig. 1,*1 (4) |
| --- | --- | --- | --- | --- |
| End separation life (time) | 2,900 | 2,750 | 2,300 | 2,100 |
|  | Fig. 1,*2 (4) | Fig. 1, (5) | Example 1, (1) | Example 1, (5) |
| End separation life (time) | 950 | 1,400 | 900 | 2,800 |

| *1Gauge of matrix rubber between cord 1 and reinforcing layer 3 | 0.2 mm |
| --- | --- |
| *2Gauge of matrix rubber between cord 1 and reinforcing layer 3 | 2 mm | and the chaffer and further show that the estimation by using simple composites described in Examples 1-5 is accurate as a method of simulation of end separation of the real tire.

EXAMPLE 6

This example will explain applying the method of reinforcing the end of the high modulus fiber cords according to the present invention to the ends of breakers in steel radial tires for trucks and busses.

The size of the tires was 10.00 – 20. The breaker ends 4 in FIG. 4 were covered with the reinforcing layer of the type as shown in FIG. 1A, having a thickness of 0.75 mm. Steel cords having a twisting structure of 1×3×0.20 +6×0.38 were used as the breaker cords and the rubber compound of Example 1, compound No. (5) was used as the reinforcing layer. Except for the above conditions, the tires were manufactured in the conventional manner and were installed on the rear wheels of a high-speed bus. The tires were used at high speeds under such a condition that the shoulder portion of the tire had applied thereto a particularly large load. The tires according to the present invention were run until the tread rubber was worn out (120,000 Km) and there was no trouble in the breaker portion. On the other hand, the tires having applied thereto no reinforcement of the present invention experienced end separation in the second breaker end from the interior of the tire at a distance of 72,000 Km and the running was impossible.

This result shows that the present invention is very practical and is effective for the reinforcement of the breaker end.

What is claimed is:

1. In a pneumatic tire including breaker, carcass and chaffer members, the improvement characterized by at least one member selected from the group consisting of the breaker, carcass and chaffer members comprising high modulus fiber cords having a Young's modulus of not less than $4.0 \times 10^5$ Kg/cm$^2$, said fiber cords being covered in the vicinities of their ends with a rubber containing synthetic polyisoprene having not less than 90 percent by weight of cis-1,4-isoprene unit, the amount of said synthetic polyisoprene being not less than 20 percent by weight of the total rubber hydrocarbon.

2. A pneumatic tire as claimed in claim 1, wherein said high modulus fiber cords comprise steel cords.

3. A pneumatic tire as claimed in claim 1, wherein said rubber containing the synthetic polyisoprene covers an area within 1 mm forward of the cord end surface and an area of 10mm along the cord axis from the cord end and within 1mm from the peripheral surface of the cord.

4. A pneumatic tire as claimed in claim 1, wherein said synthetic polyisoprene is blended with a material selected from the group consisting of natural rubber, styrene-butadiene copolymeric rubber, cis-polybutadiene rubber and the mixtures of these rubbers.

5. A pneumatic tire as claimed in claim 4, wherein the synthetic polyisoprene rubber contained in said rubber blend is of not less than one-half of the total rubber hydrocarbon, the total amount of said synthetic polyisoprene rubber and natural rubber contained in said rubber blend being not less than three-fourths of the total rubber hydrocarbon.

* * * * *